United States Patent [19]
Tobias

[11] Patent Number: 5,483,335
[45] Date of Patent: Jan. 9, 1996

[54] MULTIPLEX SPECTROSCOPY

[76] Inventor: Reginald Tobias, 822 Langen Rd., Lancaster, Mass. 01523

[21] Appl. No.: 223,225

[22] Filed: Apr. 5, 1994

Related U.S. Application Data

[63] Continuation-in-part of Ser. No. 33,339, Mar. 18, 1993.
[51] Int. Cl.⁶ .................................. G01J 3/02; G01J 3/42
[52] U.S. Cl. .......................... 356/310; 356/326; 356/328; 356/330
[58] Field of Search ..................................... 356/310, 326, 356/328, 330, 334

[56] References Cited

U.S. PATENT DOCUMENTS

3,700,890  10/1972  Kruezer ............................... 250/43.5 R
4,755,056   7/1988  Yasuda et al. ........................... 356/328
4,790,654  12/1988  Clarke .................................... 356/310
5,200,796   4/1993  Lequime ................................ 356/346
5,221,959   6/1993  Ohyama et al. ........................ 356/310
5,285,254   2/1994  De Sa .................................... 356/308

Primary Examiner—Steven H. Loke
Assistant Examiner—David B. Hardy
Attorney, Agent, or Firm—George E. Kersey

[57] ABSTRACT

Analysis of energy emanating from a source having a focal plane by converting the energy from the source into modulated spectral components simultaneously distributed according to frequency along a flat field, using, for example, a modulator, and then detecting and demodulating the spectral components, for example by a fast Fourier transform or synchronous demodulator with a ruled grating interposable between the source and the detector and a linear variable bandpass filter interposable between the source and the detector.

17 Claims, 11 Drawing Sheets

MULTIPLEX SPECTROSCOPY

This is a continuation-in-part of Ser. No. 08/033,339 filed Mar. 18, 1993. The invention relates to the detection of multiple optical frequency constituents emanating from a source, and more particularly, to multiplex spectrometry for the simultaneous detection of multiple frequency constituents.

BACKGROUND OF THE INVENTION

In spectrometry the spectral components emitted by bodies and substances are observed using a spectroscope. The spectral components can be separated from one another on a frequency basis. This separation can take place using a grating in which a series of very fine grooves are used to disperse incident electromagnetic energy.

Standard concave grating spectrometers admit electromagnetic energy in the form of light from a source through a small aperture and focus the spectrum on a suitable surface. For standard ruled concave gratings, the surface is called a "Rowland Circle". The surface is a flat focal plane in the case of flat-field holographic, stigmatic holographic or specially ruled concave gratings.

Standard plane grating spectrometers also admit light from a source through a small aperture. A mirror or lens then collimates the light, which illuminates a plane grating that initially disperses the spectrum largely onto a focusing mirror, followed by focusing onto a flat focal plane. A single small aperture may then be used with a single detector and the grating turned in order to sequentially produce monochromatic light of varying wave lengths at the aperture.

Conventionally, small apertures and single detectors are placed on the Rowland Circle for specific wavelengths of interest, or for flat-field holographic gratings, array detectors with many closely spaced detectors are placed on a flat focal plane. The array detectors allow the whole spectral range of interest to be observed simultaneously through electronic multiplexing. These array detectors may also be used with plane grating spectrometers, but will generally cover only small segments of the total spectrum.

Array detectors have found to be advantageous in applied spectroscopy. They allow rapid acquisition of the complete spectrum, since they employ parallel rather than sequential data acquisition. In addition, there often is an enhanced signal-to-noise advantage with multiplexing. Array detectors also can eliminate the need for moving parts in the spectrometer system, resulting in reduced cost and improved life and durability.

Array detector technology for the visible region of the spectrum has advanced rapidly because of the demand for similar types of devices created by telecommunications. Such detectors have been based on silicon light detection over the spectrum ranging from deep ultraviolet (200 nm wavelength) to the close near infrared (1100 nm wavelength). Silicon light detectors perform well and are relatively inexpensive with a cost ranging from tens to hundreds of dollars.

Array detectors which are useful in the near and mid-infrared region of the spectrum have been developed for military use in smart weapons. While military arrays would be useful for general spectroscopy, their complexity makes them unsuitable for mass manufacturing. The spectroscopes that have been designed on the basis of military technology are low quality and are extremely expensive, each costing thousands to tens of thousands of dollars.

Accordingly, it is an object of the invention to facilitate spectroscopy. A related object is to facilitate spectroscopy in the frequency ranges where conventional methods have proved to be inadequate or too costly.

A further object of the invention is to eliminate the need for array detectors in spectroscopy, while realizing the advantages of array detection.

Another object of the invention is to avoid the need for complex gratings in facilitating spectroscopy where conventional methods have proved inadequate. A related object is to use plane grating spectrometers to achieve performance comparable to more complex spectrometers. A further object is to use plane grating spectrometers, without the need for array detectors and the disadvantage of such detectors in generally covering only small segments of the total spectrum.

SUMMARY OF THE INVENTION

In accomplishing the foregoing and related objects, the invention makes use of the reversibility of optical systems and illuminates what would be the focal plane in a conventional system with the homogeneous light from the source. The system accepts at each point on the focal plane only the wavelength of light corresponding with that point, i.e., if wavelength "A" had been focused at position A in a conventional system, then only wavelength "A" will be accepted by the system in reverse, and be focussed only at the conventional entrance aperture, which becomes the exit aperture of the invention. Hence, the system recombines all wavelengths present at the focal plane into a single beam at the new exit aperture.

In accordance with another aspect of the invention, a modulator such as a chopper wheel is placed at the focal plane so that a set of apertures of width equal to an array pixel (single detector) is spaced in a row close together after the fashion of an array detector. Each wavelength position of apertures has a different number of apertures per revolution as the chopper wheel rotates. Consequently, each wavelength arrives at the exit aperture modulated at a different frequency, and a relatively inexpensive single detector may be placed at the new exit aperture. The combined signal is demodulated into separate wavelength signals using standard synchronous demodulation techniques.

In accordance with a further aspect of the invention, harmonics are avoided by structuring each chopper aperture to generate a pure sine wave as it passes over the associated focal plane aperture. This eliminates any cross talk due to chopping harmonics and allows a greater selection of the number of apertures and chopping frequencies.

A ruled grating, which can be planar, can be interposed between the source and the detector. Alternatively, a linear variable bandpass filter can be interposed between the source and the detector.

The demodulator for detecting spectral components can be a fast Fourier transform demodulator or a synchronous demodulator.

In a method of the invention for analyzing the spectrum of energy emanating from a source, the steps include (a) converting energy from the source into spectral components distributed according to frequency along a flat field; and (b) detecting the spectral components. The method can including the further step of (c) demodulating the spectral components.

The method of the invention for analyzing the spectrum of energy emanating from a source can use the reversibility of optical systems, and illuminating what would be the focal plane in a conventional system, with light from a source.

The method can further include the step of accepting at each point on the focal plane only the wavelength of light corresponding with that point, so-that if wavelength "A" had been focused at position A in a conventional system, then only wavelength "A" will be accepted in reverse, and be focused only at an an exit corresponding to a conventional entrance aperture. In another step all wavelengths present at the focal plane are recombined into a single beam at an exit aperture.

The method also includes the step of placing a modulator, such as a chopper wheel, at the focal plane so that a set of apertures of width equal to an array pixel (single detector) are spaced in a row close together after the fashion of an array detector. A different number of apertures is provided per revolution as the chopper wheel rotates. Each wavelength arrives at the exit aperture modulated at a different frequency, and a single detector is placed at the exit aperture. Harmonic avoidance is achieved by structuring each chopper aperture to generate a pure sine wave as it passes over the associated focal plane aperture, thereby to eliminate cross talk due to chopping harmonics.

DESCRIPTION OF THE DRAWINGS

Other aspects of the invention will become apparent after considering several illustrative embodiments, taken in conjunction with the drawings in which.

DETAILED DESCRIPTION

Figure 1:
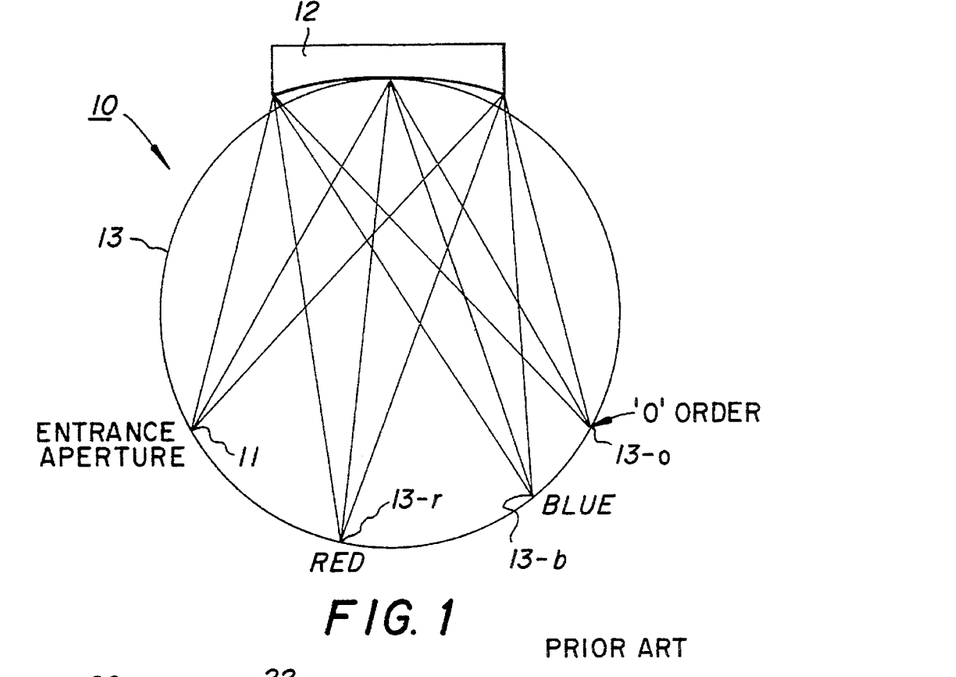
FIG. 1 is a schematic diagram of a spectrometer of the prior art using a "Rowland Circle" focal plane.

With reference to the drawings FIG. 1 shows a standard concave grating spectrometer 10 which admits electromagnetic energy in the form of light from a source through a small entrance aperture 11. The light is applied to a ruled grating 12, which disperses the spectral components of the incoming energy and focuses them on a suitable surface 13. For the ruled concave grating 12, the focal surface 13 is called a "Rowland Circle". Because of the dispersion of the spectral components on the focal circle 13, the lowest frequency, longest wavelength components are closest to the entrance aperture 11. Thus the "red" frequency components appear at position 13-r on the Rowland Circle. Higher frequency components appear farther along the surface 13, away from position 13-r. Thus the higher frequency, shorter wavelength "blue" components appear at position 13-b. The specular white light of "0" order appears at position 13-o.

Conventionally, small apertures and single detectors (not shown) are placed on the Rowland Circle 13 for specific wavelengths of interest. This procedure has the disadvantage of requiring many single detectors, and is less favored than the spectrometer 20 of FIG. 2.

Figure 2:
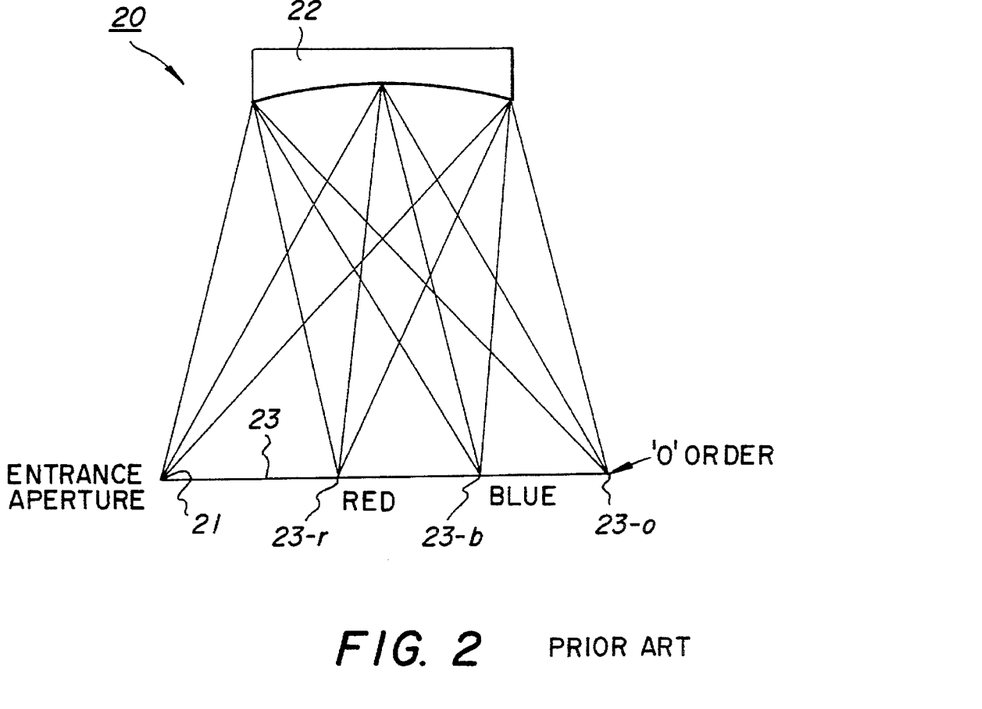
FIG. 2 is a schematic diagram of a spectrometer of the prior art housing a flat-field or stigmatic flat-field holographic or ruled grating of the prior art and a flat or planar focal plane.

Where, as shown in FIG. 2 for the spectrometer 20, a flat-field or stigmatic concave grating 22 is used, the focal surface 23 is a flat focal plane. Electromagnetic energy in the form of light from a source (not shown) enters through a small entrance aperture 21. The light is applied to the grating 22, which disperses the spectral components of the incoming energy and focuses them on the flat focal plane 23. Because of the dispersion of the spectral components on the focal plane 23, the lowest frequency, longest wavelength components are, again, closest to the entrance aperture 21. Thus the "red" frequency components appear at position 23-r on the focal plane 23. Higher frequency components appear farther along the surface 23 away from position 23-r. Thus the higher frequency, shorter wavelength "blue" components appear at position 23-b. The white light of "0" order appears at position 23-o.

While small apertures and single detectors can be placed on the focal plane 23 for specific wavelengths of interest,it is preferable to use array detectors (not shown), with many closely spaced detectors are placed along the flat focal plane 23. Array detectors allow the whole spectral range of interest to be observed simultaneously. Array detectors have found to be advantageous in applied spectroscopy because they allow rapid acquisition of the complete spectrum, by employing parallel rather than sequential data acquisition. In addition, there is an enhanced signal-to-noise due to the multiplex advantage. Array detectors also can eliminate the need for moving parts in the spectrometer system, resulting in reduced cost and improved life and durability.

Array detector technology for the visible region of the spectrum has advanced rapidly because of the demand for similar types of devices created by telecommunications. Such detectors have been based on silicon light detection over the spectrum ranging from deep ultraviolet (200 nm wavelength) close to the near infrared (1100 nm wavelength). Silicon light detectors perform well and are relatively inexpensive with a cost ranging from tens to hundreds of dollars.

Array detectors which are useful in the near and midinfrared region of the spectrum have been developed for military use in smart weapons. While military arrays would be useful for general spectroscopy, their complexity makes them unsuitable for mass manufacturing. The spectroscopes that have been designed on the basis of military technology are low quality and are extremely expensive, each costing thousands to tens of thousands of dollars.

Figure 3A:
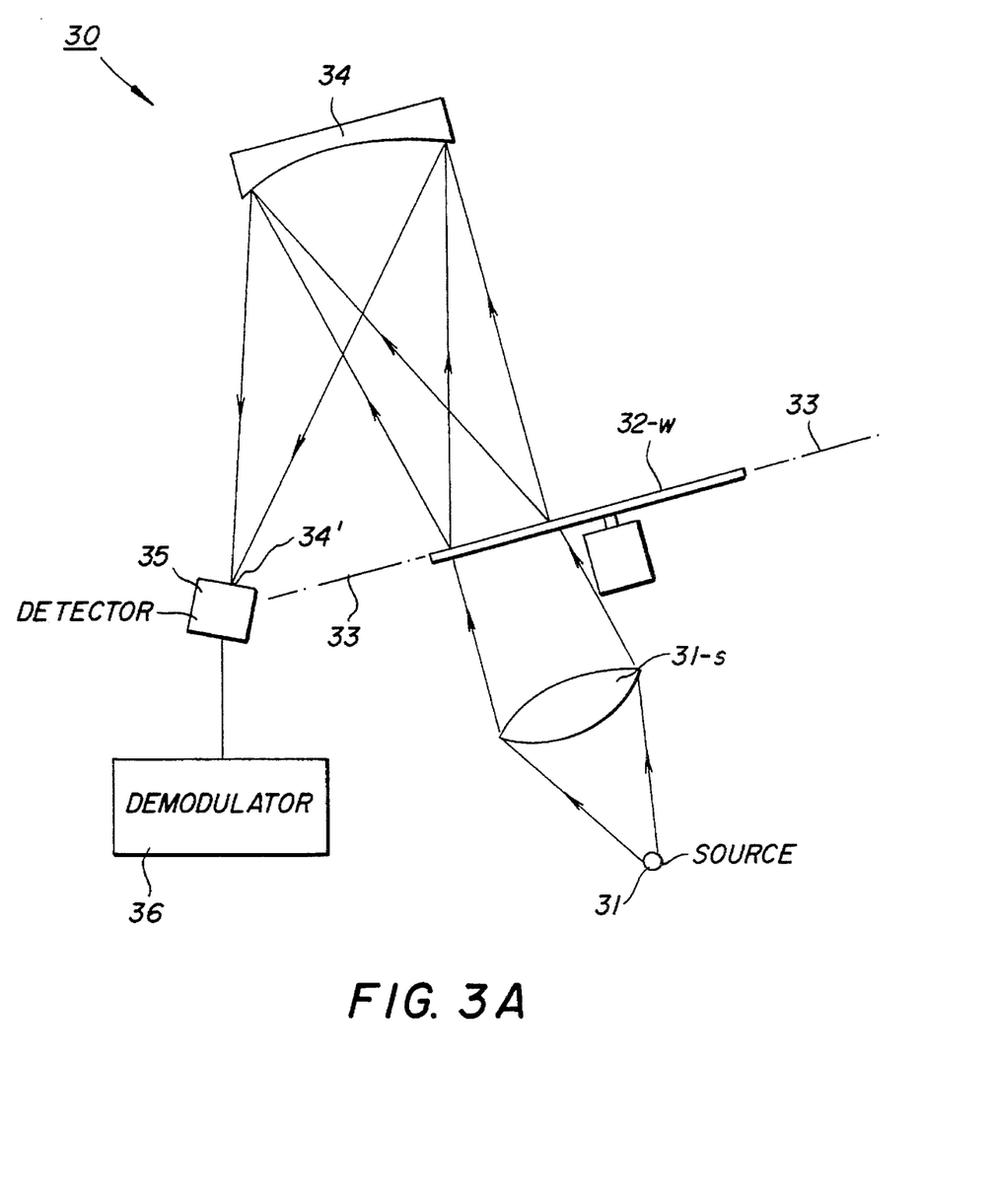
FIG. 3A is a schematic diagram of a spectrometer in accordance with the invention.
Figure 3B:
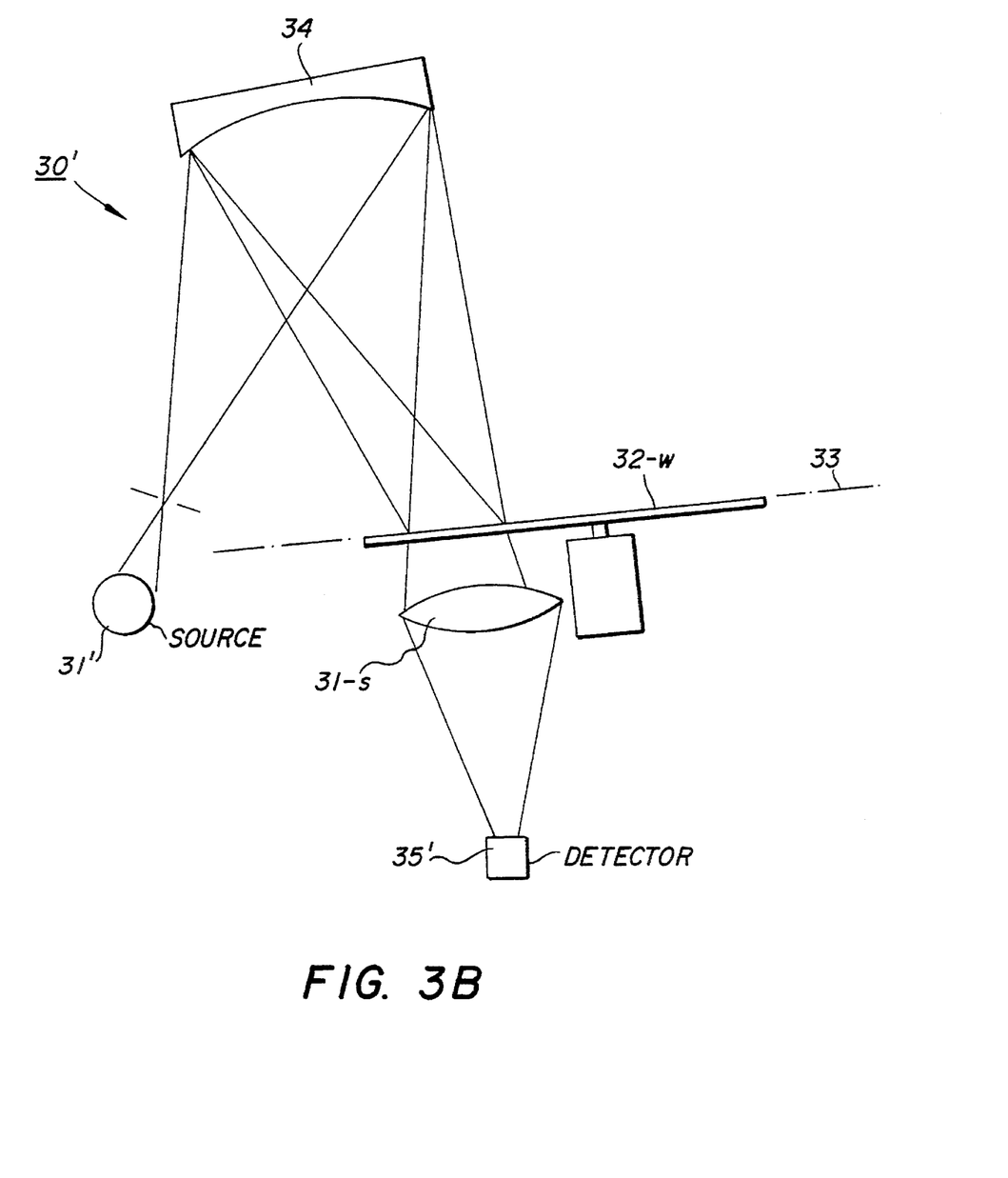
FIG. 3B is a schematic diagram of an alternative spectrometer in accordance with the invention.

To permit the same quality of spectral detection that is achieved by array detection, without the need for array detection, while expanding spectral detection beyond the capability of array detection, the invention provides spectrographic systems 30 and 30' of the kinds shown in FIGS. 3A and 3B.

In the system 30 of FIG. 3A, light or other electromagnetic energy from a source 31 is applied through a collecting optic 31-s to a chopper, with a chopper wheel 32-w positioned at a flat field 33 that would be a focal plane in conventional spectroscopy with the grating 34.

Because of the structure of the chopper wheel 32-w, as discussed below in conjunction with FIGS. 4A and 4B, spectral components appear at positions along the flat field 33 corresponding to positions shown on the focal plane 23 of FIG. 2. Thus "red" components are extracted from the broad-band radiation at position, and "blue" components are extracted from the broad-band radiation at position. These components are combined at the grating 34 and reflected to a single detector 35, which, in turn, is connected to a demodulator 36. The demodulator 36 can use the known fast Fourier transform (FFT) technique, or the known synchronous demodulation technique.

As can be seen by comparing FIGS. 1 and 2 with FIGS. 3A, 3B, 4A and 4B, the invention makes use of the reversibility of optical systems and illuminates what would be the focal plane 33 in a conventional system with homogeneous broad-band light from the source 31. The system 30 accepts at each point on the flat field 33 only the wavelength of light corresponding with that point, i.e., if wavelength 13-r or 23-r of FIG. 1 or FIG. 2 had been focused at position in a conventional system 10 or 20, then only a wavelength at position will be accepted by the system 30 in reverse, and be focused only at the conventional entrance aperture 11 or 21, which becomes the exit aperture 34' of the invention.

Hence, the system 30 recombines all wavelengths present at the former focal plane, now the flat field 33, into a single beam at the new exit aperture 34'.

Figure 4A:
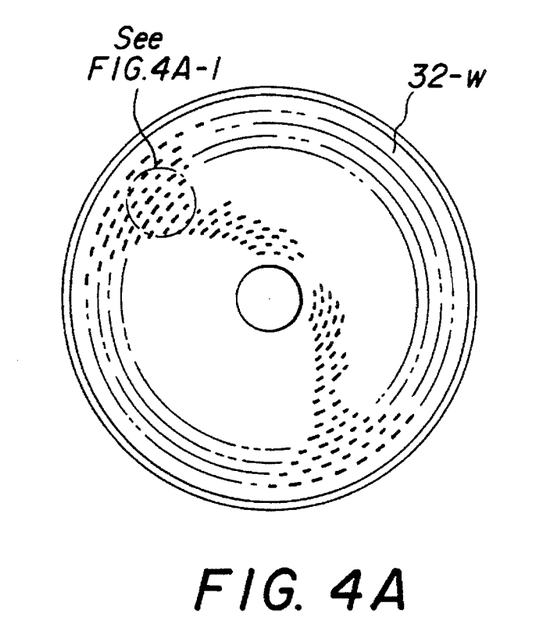
FIG. 4A is a schematic diagram of chopping wheel in accordance with the invention for the spectrometer of FIG. 3.
Figure 4A:
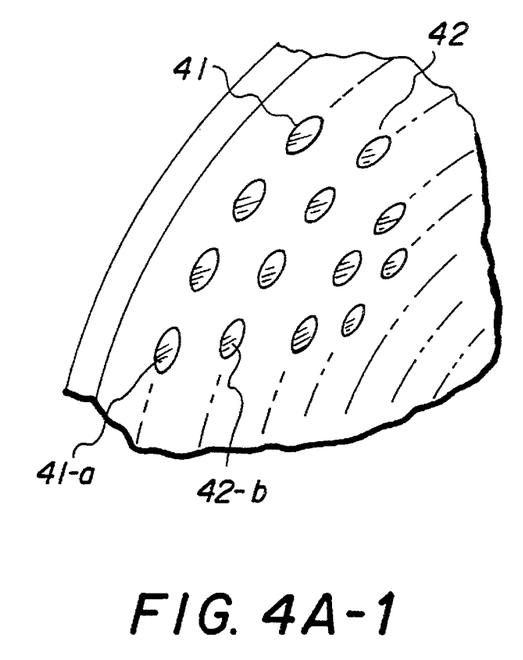
FIG. 4B is a schematic diagram of an alternate chopping wheel of the kind shown in FIG. 4A for the spectrometer of FIG. 3.
Figure 4B:
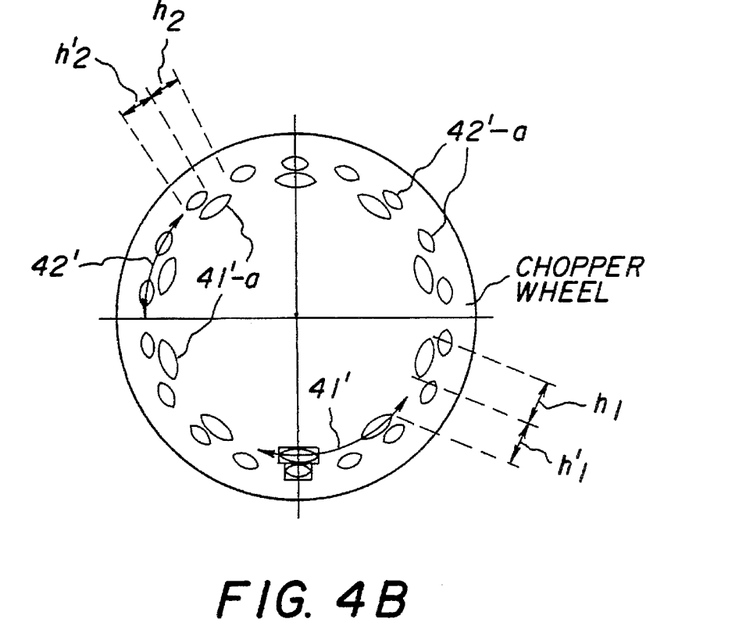

The modulator 32, such as the chopper wheel 32-w, is placed at the former focal plane, now the flat field 33, so that, as shown in FIG. 4A, a set of apertures, each of a width equal to an array pixel (single detector) is spaced in a row close together after the fashion of an array detector.

In the system 30' of FIG. 3B, the positions of the source 31 and the detector 35 in FIG. 3A are interchanged, so that light or other electromagnetic energy from a source 31' is applied at the former detector position to impinge upon the grating 34, from which it is reflected to the flat field 33 where the chopper wheel 32-w is positioned. Spectral components from the chopper wheel pass through the collecting optic 31-s and then to a detector 35'. As for FIG. 3A, the chopper wheel 32-w of the chopper is positioned at a flat field 33 that would be a focal plane in conventional spectroscopy with the grating 34.

Once again, because of the structure of the chopper wheel 32-w, as discussed below in conjunction with FIGS. 4A and 4B, spectral components appear at positions along the flat field 33 corresponding to positions shown on the focal plane 23 of FIG. 2. Thus "red" components are extracted from the broad-band radiation at position, and "blue" components are extracted from the broad-band radiation at position. These components from the grating 34 are applied to a single detector 35', which, in turn, is connected to a demodulator. The demodulator 36' can use the known fast Fourier transform (FFT) technique, or the known synchronous demodulation technique.

As can be seen by comparing FIGS. 1 and 2 with FIGS. 3A, 3B and 4A and 4B, the invention makes use of the reversibility of optical systems and illuminates what would be the focal plane 33 in a conventional system with homogeneous broad-band light from the source 31. The system 30 accepts at each point on the flat field 33 only the wavelength of light corresponding with that point, i.e., if wavelength 13-r or 23-r of FIG. 1 or FIG. 2 had been focused at position in a conventional system 10 or 20, then only a wavelength at position will be accepted by the system 30 in reverse, and be focused only at the conventional entrance aperture 11 or 21, which becomes the exit aperture 34 of the invention.

Hence, the system 30 recombines all wavelengths present at the former focal plane, now the flat field 33, into a single beam at the new exit aperture 34.

The modulator, such as the chopper wheel 32-w, is placed at the former focal plane, now the flat field 33, so that, as shown in FIG. 4A, a set of apertures, each of a width equal to an array pixel (single detector) is spaced in a row close together after the fashion of an array detector.

In particular, FIG. 4A includes a plurality of concentric rows, of which rows 41 and 42 are shown in detail. Each wavelength position of apertures, i.e. of the rows 41 and 42, has a different number of apertures per revolution as the chopper wheel 32-w rotates. Consequently, each wavelength arrives at the exit aperture 34 of FIG. 3A modulated at a different frequency. As a result, a relatively inexpensive single detector 35 is placed at the new exit aperture 34. The combined signal is demodulated into separate wavelength signals using a standard synchronous or fast Fourier transform demodulator 36. Harmonics are avoided by structuring each chopper aperture, such as the apertures 41-a and 42-a of FIG. 4A in the form of an elongated "eye" to generate a pure sine wave as it passes over the associated flat field. This eliminates any cross talk due to chopping harmonics and allows a greater selection of the number of apertures and chopping frequencies.

It will be appreciated that while the apertures 41-a are shown as having a greater spectrographic height, i.e., geometric width, than the apertures 42-a, the circular row sizing of the apertures 41-a and 42-a may be interchanged. In FIG. 4B the apertures 42'-a are in an outer circular row beyond the circular row containing the apertures 41'-a. As indicated in FIG. 4B, the interval between adjoining apertures 42'-a is equal to the geometric width, i.e., spectrographic height of the apertures, along the row containing the apertures. Thus, the spectrographic height h2 of the apertures 42'-a in the row 42' is the same as the height h'2 between adjoining apertures. Similarly, the height h1 of the apertures 41'-a is the same as the interaperture interval h'1. In other words, for the apertures of each row to be appropriately spaced, the space between aperture "eyes" is the same as the space of the eye. This kind of spacing permits the invention to be used with synchronous detection, as well as fast Fourier transform detection.

Figure 5A:
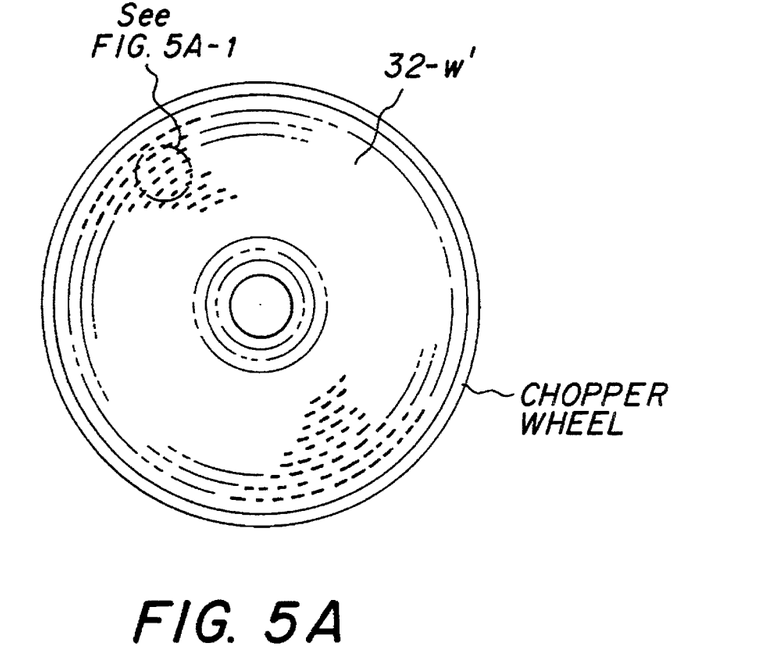
FIG. 5A is a schematic diagram of an alternative chopping wheel in accordance with the invention for the spectrometer of FIG. 3.
Figure 5A:
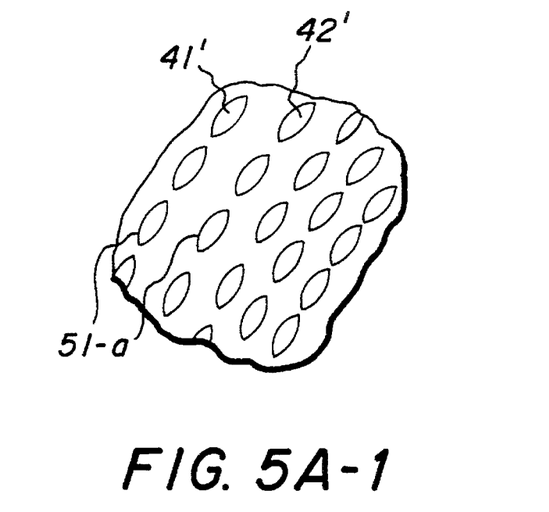
FIG. 5B is a schematic diagram of the kind shown in FIG. 5A with inappropriately space apertures.
FIG. 5C is a schematic diagram of the chopping wheel of FIG. 4B with appropriately spaced apertures in accordance with the invention for the spectrometer of FIG. 3.

In order to provide a "multiplexing" effect with noise reduction, the alternative embodiment of FIG. 5A makes use of equal-sized apertures 51-a. This is by contrast with the differently sized apertures in FIGS. 4A and 4B in each succeeding row, such as for the rows 41, 41', 42 and 42'. Each wavelength position of the apertures 41, 41', 42 and 42' has a different radius.

In FIG. 5A while the size remains the same for each aperture 51-a, the inward positioning can produce a multiplexing frequency change that achieves noise reduction. This is by comparison with non-signal noise intervals between successive choppings for the wheels of FIGS. 4A and 4B. Because of the equal sizes of the apertures 51-a there can be virtually no non-signal noise intervals for the embodiment of FIG. 5A.

Figure 5B:
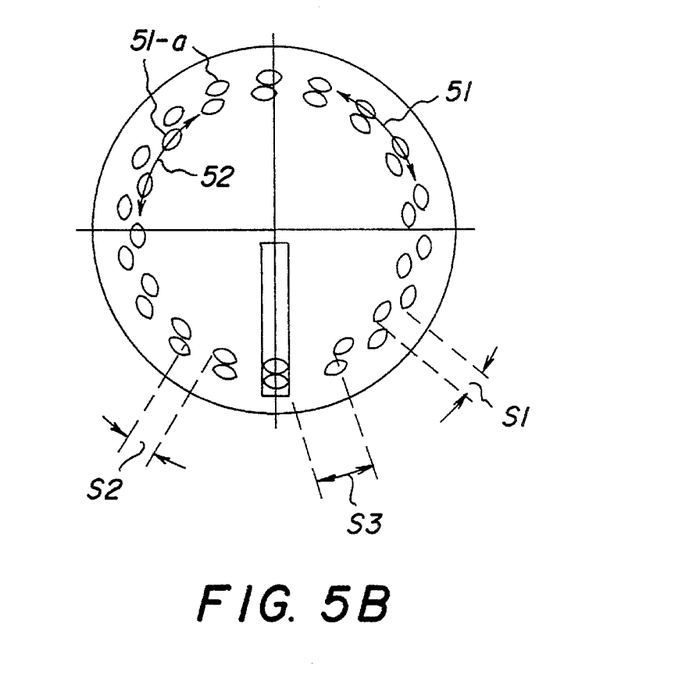

However, when an attempt is made to arrange the equal-sized apertures 51-a for multiplexing, with a changing interaperture spacing as the rows approach the center of the chopper wheel, there is difficulty in achieving the appropriate inter-eye interval for interiorly located rows. This is illustrated in FIG. 5B where there is an increased interaperture spacing s2 for the row 52 as compared with the spacing s1 for the row 51. The increase in spacing s2 results in an excessively large spacing s3 at the end of the row 52. While the chopper wheel of FIG. 5B can be used, it does not produce the desired reduction in non-signal noise.

Figure 5C:
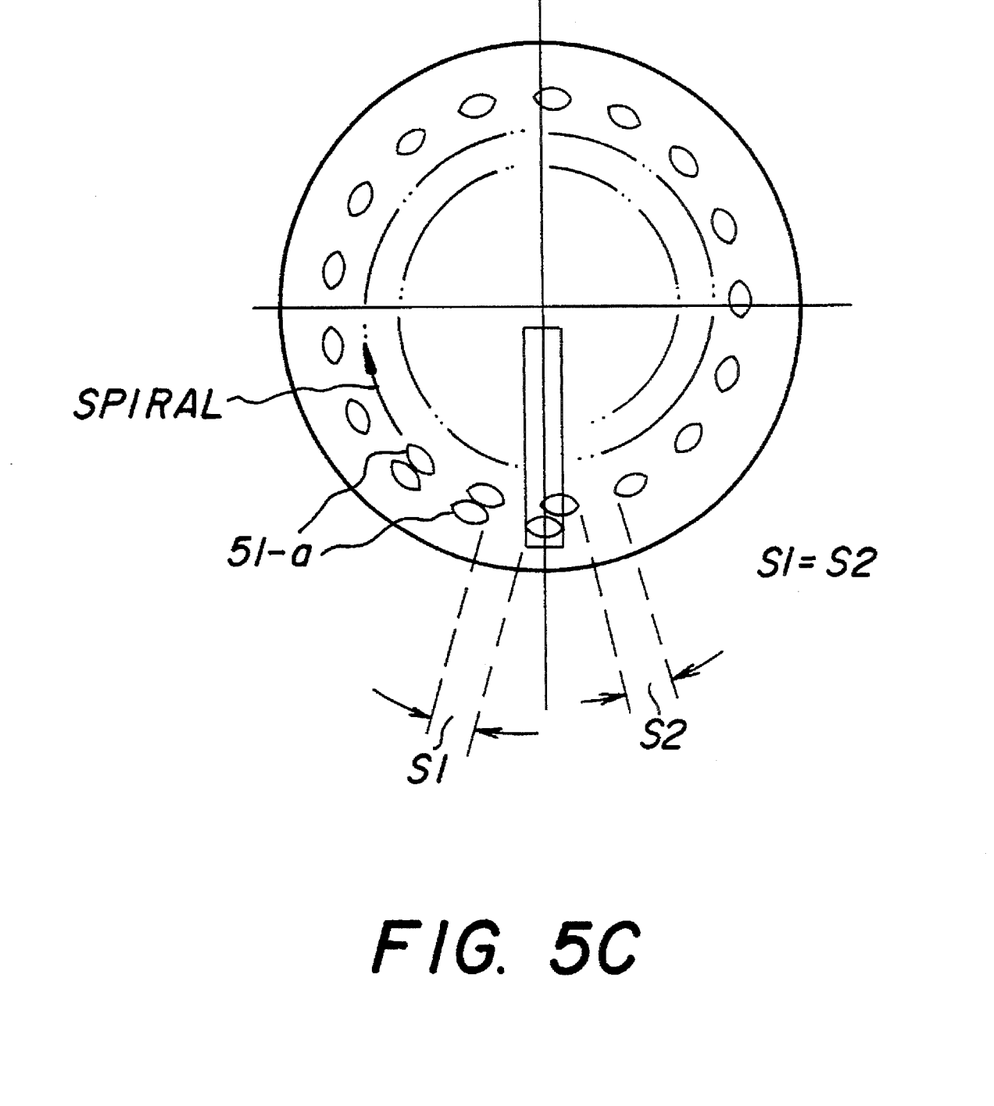

The invention, nevertheless, achieves the desired elimination of non-signal noise intervals by the spiraling of the apertures 51-a as shown in FIG. 5C. As a result of the inward spiraling, a wheel is produced with the desired objective of having equal sized apertures 51-a without the creation of inappropriate spacing between any apertures, such as the space s3 of FIG. 5B.

Consequently, each wavelength from the chopper wheel of FIG. 5C arrives at the exit aperture 34 of FIG. 3A modulated at a different frequency with a significant noise reduction. As a result, a relatively inexpensive single detector 35 is placed at the new exit aperture 34. The combined signal is demodulated into separate wavelength signals using a standard synchronous or fast Fourier transform demodulator 36. Harmonics again are avoided by structuring each chopper aperture 41' of FIG. 4B to generate a pure sine wave as it passes over the associated flat field. This also eliminates any cross talk due to chopping harmonics and allows a greater selection of the number of apertures and chopping frequencies.

Figure 6:
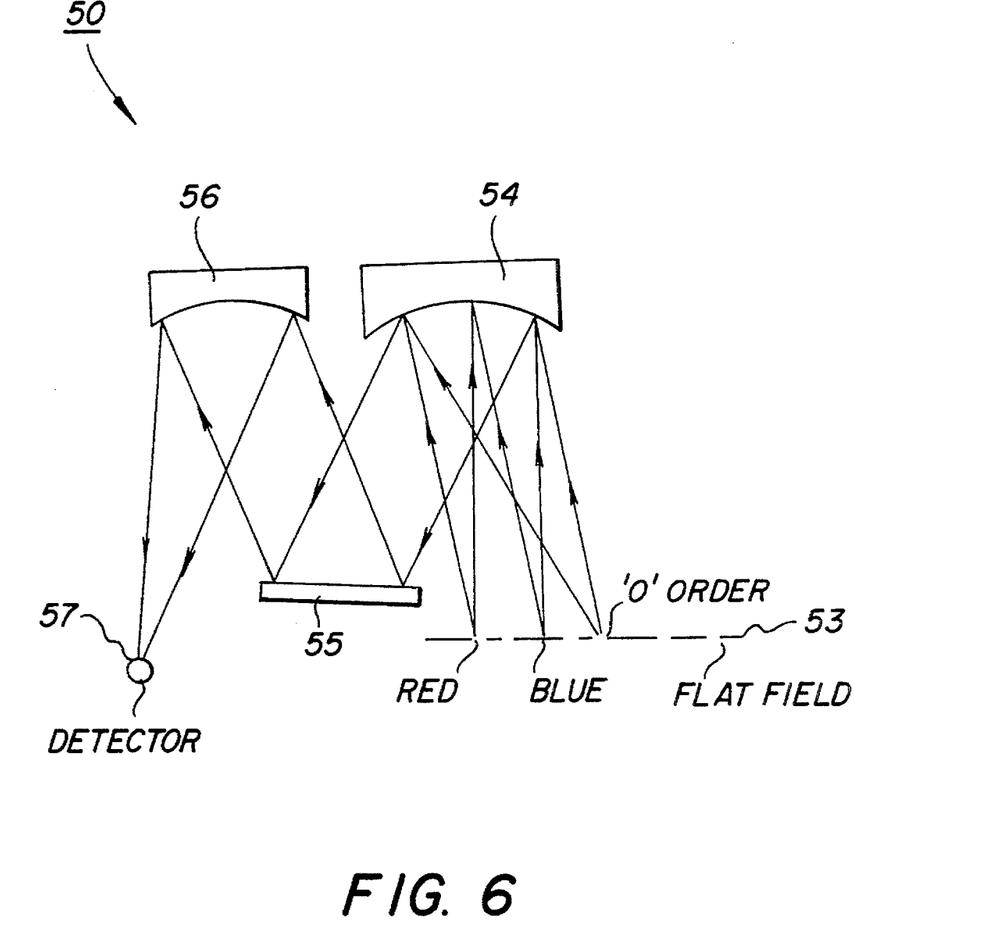
FIG. 6 is a schematic diagram of an illustrative plane grating system of the prior art for use in the spectrometers of FIGS. 3A and 3B.

In place of the grating 34, the invention can make use of plane ruled grating system 50. The system 50 is of the Czerney-Turner type with a flat focal plane 53 that serves as the flat field 33 of FIGS. 3A and 3B. The spectral components from the field 53 are collected and collimated by a mirror 54 which illuminates a ruled grating 55, then to a focusing mirror 56 which reverses collimation and focuses the spectral components at the detector position (exit) 57 (corresponding to position 35 in FIG. 3A).

Thus the invention permits multiplexing to be achieved with a standard plane grating spectrometer where light is admitted from a source through a small aperture, and a mirror or lens then collimates the light before illuminating a plane grating that initially disperses the spectrum largely onto a focusing mirror, followed by focussing onto a flat focal plane. The advantage of an array detectors is achieved with a plane grating spectrometer, but without the disadvantage of covering only small segments of the total spectrum.

Figure 7A:
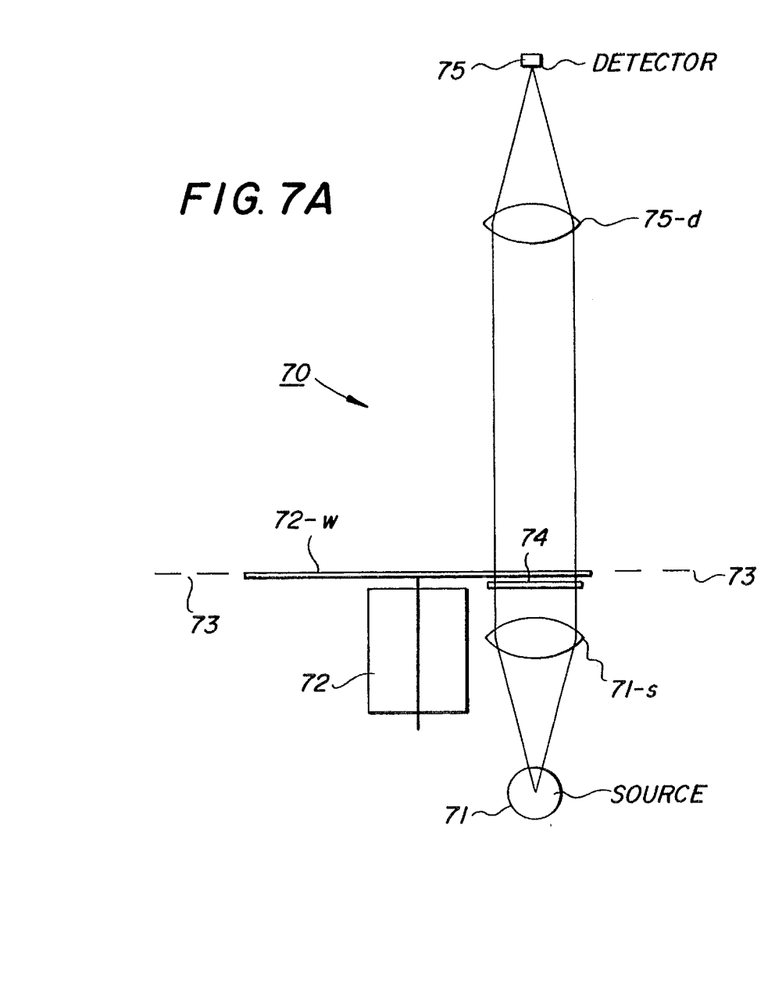
FIGS. 7A and 7B are schematic diagrams of other alternative spectrometers in accordance with the invention.

The invention also permits the elimination of any grating by using, instead, a linear variable filter 74 as shown in FIG. 7A, which is a schematic diagram of another alternative spectrometer in accordance with the invention. In the system 70 of FIG. 7A, radiation from a source 71 is applied through a collecting optic 71-s to the linear variable filter 74, and then to a chopper 72, with a chopper wheel 72-w positioned at a flat field 73 that would be a focal plane in conventional spectroscopy using a grating, such as the grating 34 of FIG. 3A. The filter 74 is used in place of the grating 34. The chopped signals are then applied to a detector 75 through an associated collecting optic 75-d.

Figure 7B:
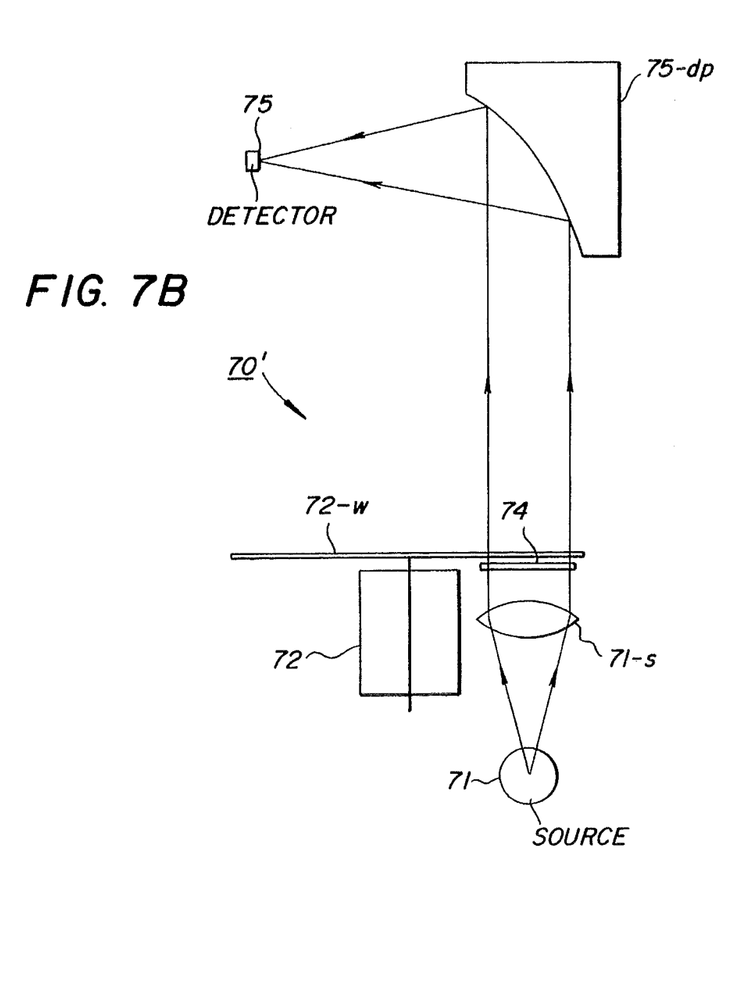

Alternatively, as shown in FIG. 7B, which is a schematic diagram of a further spectrometer in accordance with the invention, either or both of the collecting optics 71-s and 75-d of FIG. 7A is/are replaced by at least one parabolic mirror, e.g. 75-dp (and/or 71-sp, not shown). The operation is otherwise the same as for FIG. 7A.

Figure 8A:
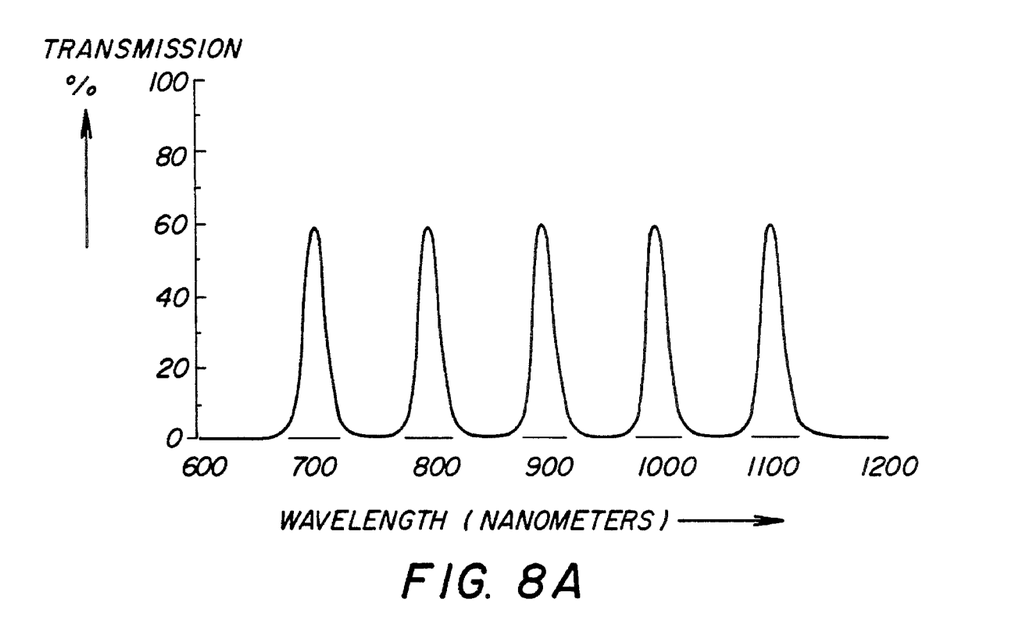
FIG. 8A is a graph illustrating the relationship between transmission and wavelength for a linear variable bandpass filter for use in the spectrometers of FIGS. 7A and 7B.

In the illustrative graph of FIG. 8A for the filter 74, a multiplicity of passbands are provided for the energy incident on the filter. Thus, for the near-infrared spectral range from about 700 to 1100 nanometers. The transmission is 60% of average signal strength, and the out-of-band blocking is 0.05% of average signal strength. The dispersion ranges from 40 nanometers per millimeter to 8 nanometers per millimeter, and the linearity ranges from ±0.5 percent. Such a filter is obtainable from OFC Corporation of Natick, Mass. 01760 under stock designation "LVF" (linear variable filter). In the graph of FIG. 8A, there is illustrated the relationship between transmission and wavelength for a linear variable bandpass filter for use in the spectrometers of FIGS. 7A and 7B.

Figure 8B:
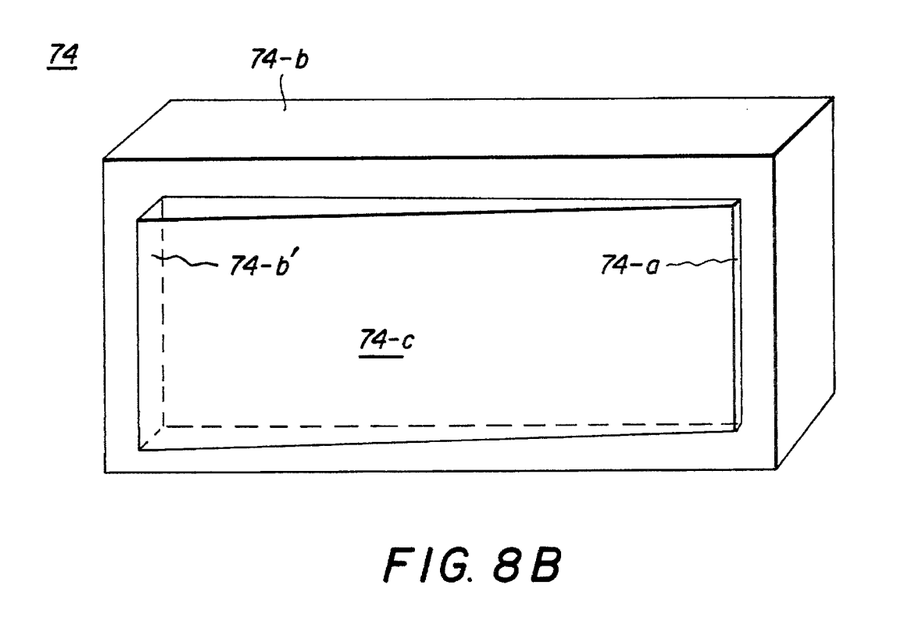
FIG. 8B is a perspective view of an illustrative linear variable bandpass filter for use in the spectrometers of FIGS. 7A and 7B.

In the perspective view of FIG. 8B for an illustrative linear variable bandpass filter 74, a transparent base plate 74-b has applied to it a multiple layer optical coating 74-c that increases in thickness from a lower-frequency end 74-a to a higher frequency end 74-b.

Figure 9A:
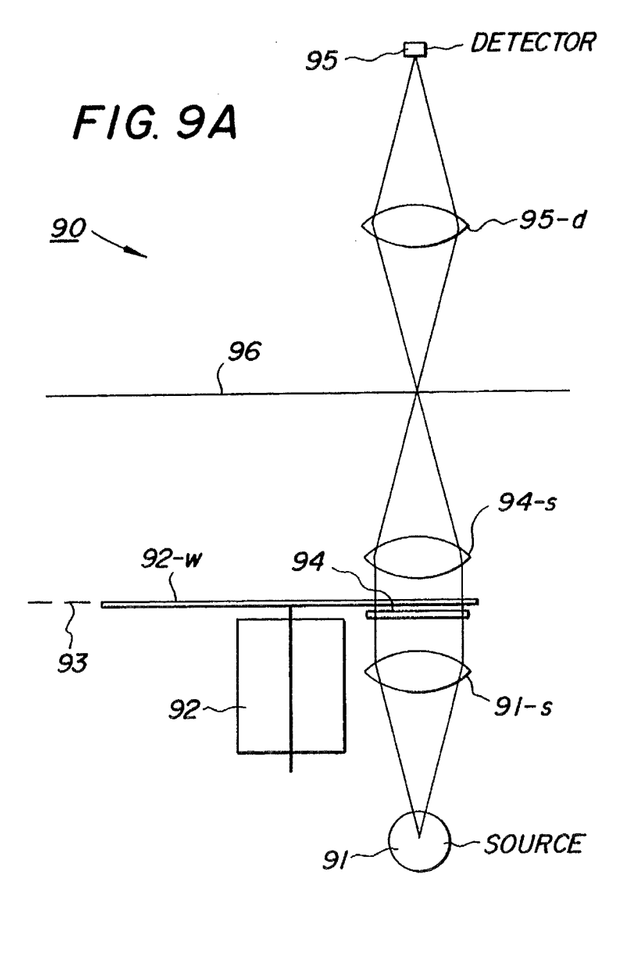
FIGS. 9A and 9B are schematic diagrams of yet other alternative spectrometers in accordance with the invention.
Figure 9B:
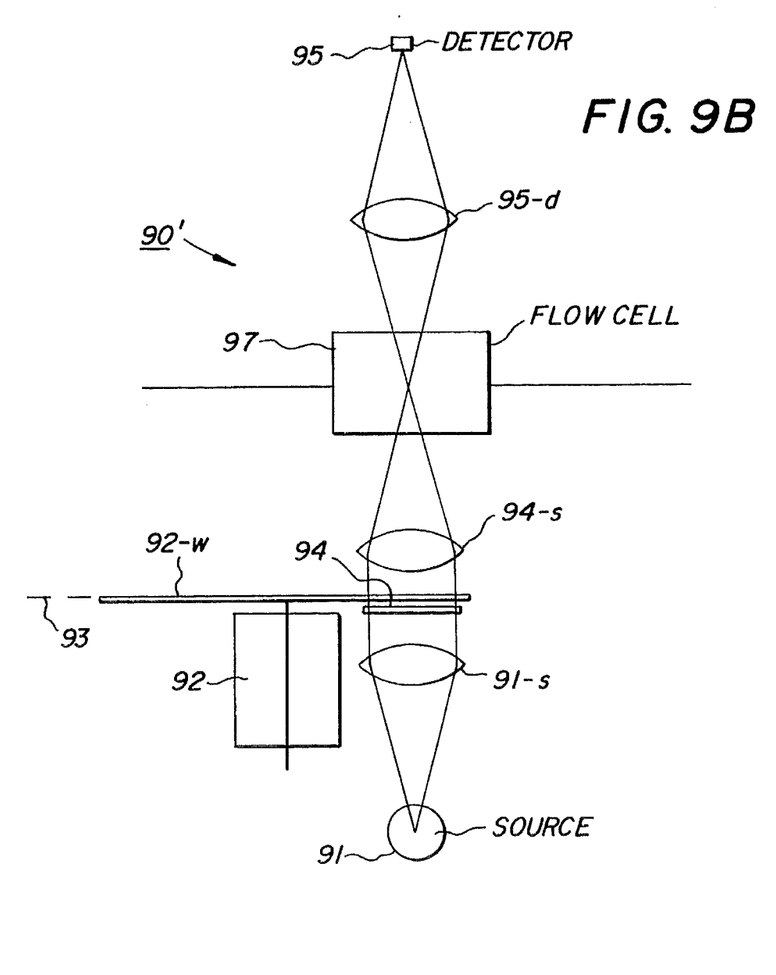

In the further alternative embodiments of FIGS. 9A and 9B, a sample to be analyzed, e.g. the translucent web 96 of FIG. 9A, or the organic materials in the flow cell 97 of FIG. 9B, is placed between focusing optics 94-s and 95-d. The detector 95, the chopper motor 92, the linear variable filter 94, the source 91, etc. are the same as for FIGS. 7A and 7B. In the case of an opaque web, the spectrometry is accomplished by reflection from the web and the apparatus is re-arranged accordingly.

The foregoing description is illustrative only, and other aspects, adaptations and modifications of the invention will apparent to persons of ordinary skill in the art.

What is claimed:

1. Apparatus for analyzing energy emanating from a source having a focal plane, which comprises:

means at said focal plane for converting said energy from the source into modulated spectral components simultaneously distributed according to frequency along a flat field; and means for detecting and demodulating said spectral components.

2. Apparatus as defined in claim 1 wherein said means for converting energy from the source into spectral components distributed according to frequency along a flat field comprises a modulator.

3. Apparatus as defined in claim 2 wherein said modulator for converting energy from the source into spectral components distributed according to frequency along a flat field comprises a chopper.

4. Apparatus as defined in claim 3 wherein said chopper for converting energy from the source into spectral components distributed according to frequency along a flat field comprises an apertured, rotatable member.

5. Apparatus as defined in claim 4 wherein said apertured, rotatable member for converting energy from the source into spectral components distributed according to frequency along a flat field comprises a member with said apertures proportioned to generated sinusoidal signals.

6. Apparatus as defined in claim 5 wherein said grating comprises a planar ruled grating.

7. Apparatus as defined in claim 1 wherein a ruled grating is interposed between said source and said means for detecting.

8. Apparatus as defined in claim 1 wherein said demodulator for detecting spectral components comprises a fast Fourier transform demodulator.

9. Apparatus as defined in claim 1 wherein said demodulator for detecting said spectral components comprises a synchronous demodulator.

10. Apparatus for analyzing energy emanating from a source having a focal plane, which comprises:

means at said focal plane for converting said energy from the source into spectral components simultaneously distributed according to frequency along a flat field; and means for detecting said spectral components;

wherein a linear variable bandpass filter is interposed between said source and said means for detecting said spectral components.

11. A method of analyzing energy emanating from a source, which comprises:

(a) converting said energy from the source into spectral components distributed according to frequency along a flat field; and (b) detecting said spectral components; wherein said spectral components are modulated, further including (c) demodulating said spectral components.

12. The method of analyzing energy emanating from a source having a focal plane for said energy, which comprises illuminating said focal plane with light from said source; and recombining all wavelengths present at the focal plane into a single beam at an exit aperture.

13. The method of claim 12 wherein said light has a plurality of wavelengths, further including accepting at each point on the focal plane only the wavelength of light corresponding with that point.

14. The method of claim 12 wherein said chopper wheel has a plurality of apertures, further including providing a different number of apertures per revolution as the chopper wheel rotates.

15. The method of claim 12 wherein said focal plane has an exit aperture and each wavelength arrives at the exit aperture modulated at a different frequency, and a single detector is placed at the exit aperture.

16. The method of claim 12 further including harmonic avoidance by structuring each chopper aperture to generate a pure sine wave as it passes over an associated focal plane aperture, thereby to eliminate cross talk due to chopping harmonics.

17. The method of analyzing energy emanating from a source having a focal plane for said energy, which comprises illuminating said focal plane with light from said source; and placing a modulator such as a chopper wheel at the focal plane so that a set of apertures of width equal to an array pixel (single detector) is spaced in a row close together.

* * * * *